United States Patent Office 3,108,622
Patented Oct. 29, 1963

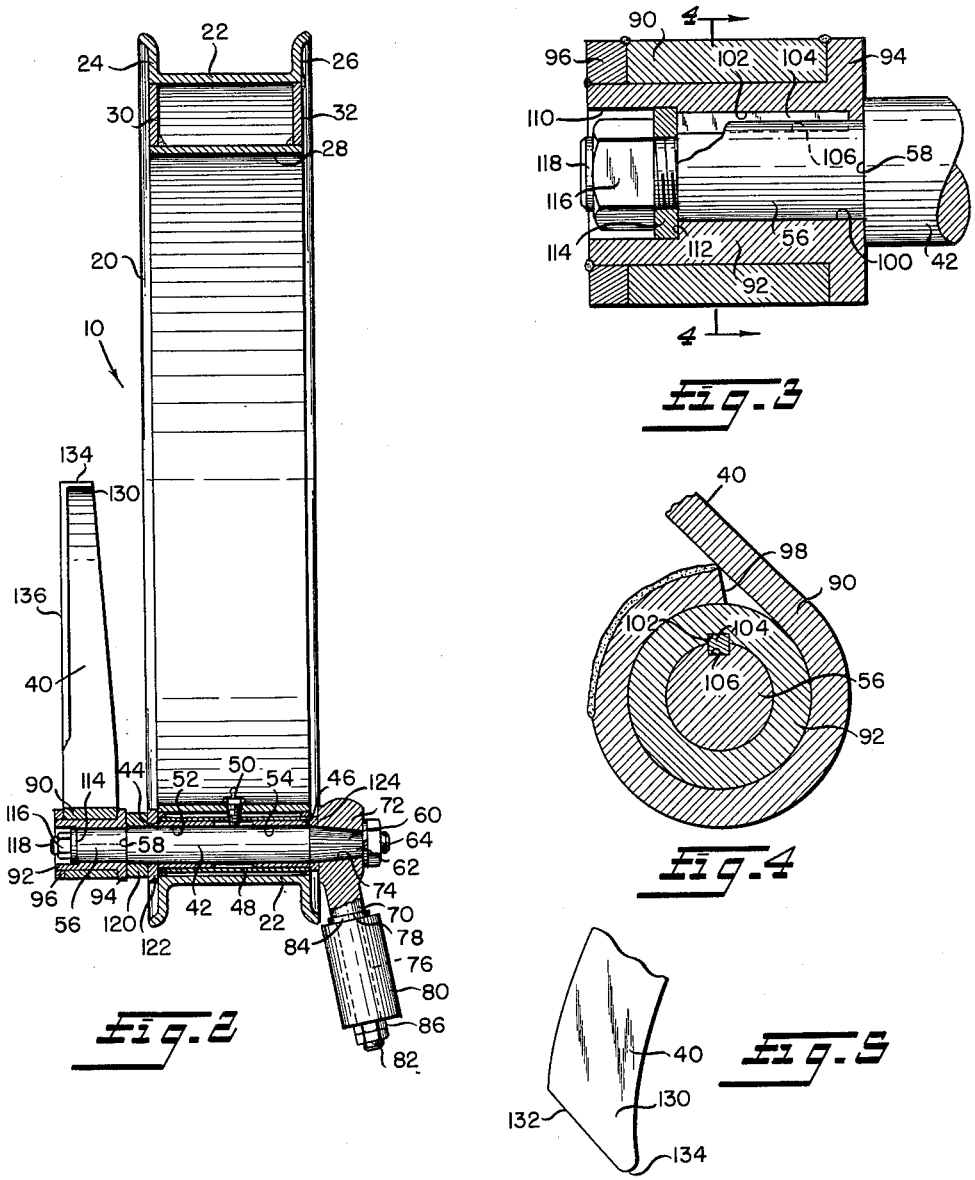

3,108,622
ROTATABLE DRUM ASSEMBLY FOR
DEBARKING MACHINE
Carl W. Kendrick, Box 182, Broken Bow, Okla.
Filed June 14, 1960, Ser. No. 36,029
5 Claims. (Cl. 144—208)

This invention relates to improvements in rotatable debarking drums and more particularly to a rotatable drum assembly which includes pivotable bark peeling blades adjacent its periphery. The rotatable drum assembly was developed for use in the debarking machine which forms the subject matter of my co-pending application Serial No. 838,210 filed on September 4, 1959, and is an improvement over the debarking drum assembly disclosed in that application.

The drum disclosed in the aforesaid application accomplished excellent results in debarking of posts and logs, the results being attributable to the combination of spring steel peeling blades, their counter-weighted mounting, the blade peeling edge formation and the triple pneumatic tired wheel mounting which provided a rotatable and axial support, as well as the input drive, for the rotatable peeling drum. However, the previously used rotatable drum had protuberances which tended to collect strips and chips of peeled bark, particularly adjacent the pivotable mounts of the peeling blades. Also, changes in blades when different sizes of logs were to be peeled, at times required a change in the L-shaped weight support rod with its fixed blade abutment member.

The present invention provides a drum construction in which extraneous projections within the drum rim, to a major extent, are eliminated. The pivotable blades are located forward of the annular drum body so peelings and bark chips will be dispersed ahead of the drum rim instead of within the drum rim. The pivotal mounting of each blade is located within an annular peripheral portion of the rim structure itself and thus cannot be jammed by chips and peelings. Furthermore, the manner of mounting the blades and weights permits easy and rapid interchangeability so the machine can accommodate different sizes of logs and posts.

Accordingly, a primary object of this invention resides in the provision of a novel improved rotatable debarking drum assembly.

A further object resides in the provision of a novel inexpensive rotatable debarking drum having bark peeling members pivotably mounted adjacent the drum periphery and disposed forward of the drum with the pivotably journalled portion located between the inner and outer peripheries of the drum.

In conjunction with the preceding object, a still further object resides in providing the foregoing debarking drum with pivotable counter-weighted peeling member units in which counterweights are disposed rearwardly of the drum and the peeling members and the counterweights are readily removable enabling rapid replacement and/or adjustment.

Still another object resides in the provision of novel pivotally mounted spring leaf peeling members, each of which has an eye provided at its pivotably mounted end, and a spool sleeve is assembled on and welded to a portion of the peeling member eye.

Further novel features and other objects of this invention will become apparent from the following detailed description, discussion and the appended claims taken in conjunction with the accompanying drawings showing a preferred structure and embodiment, in which:

FIGURE 2 is an enlarged section view of the drum assembly taken on line 2—2 of FIGURE 1 illustrating the manner in which each of the peeling members are pivotally mounted by a spindle journalled between the inner and outer peripheral portions of the drum body;

FIGURE 3 is an enlarged detail section showing the mounting of a peeling member on its associated spindle;

FIGURE 4 is a section view of the mounted end of a peeling member taken on line 4—4 of FIGURE 3; and FIGURE 5 is an enlarged view of the blade peeling end to clearly show that the edge is not sharp.

Figure 1:
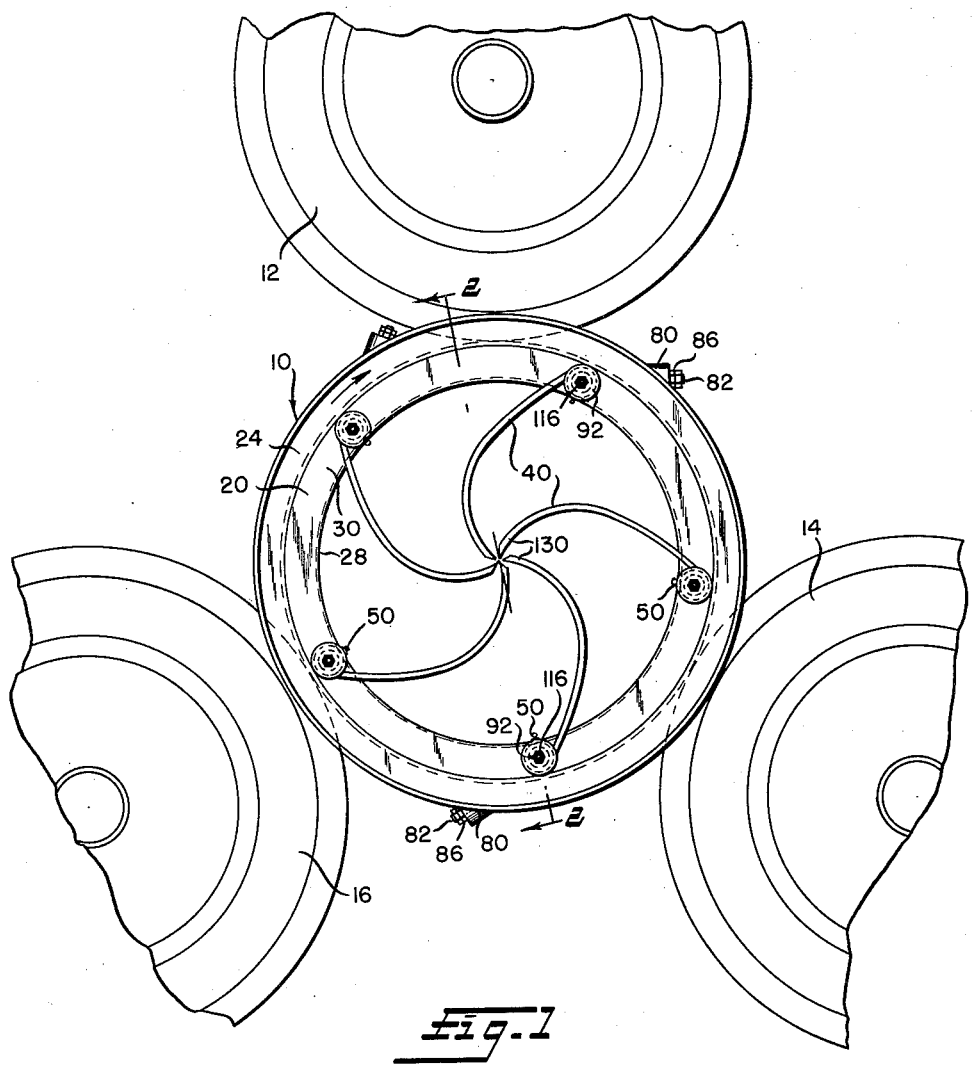
FIGURE 1 is a partially sectioned front elevation view of a debarking drum assembly constructed in accord with the present invention, the drum being rotatably mounted between three partially disclosed pneumatically tired wheels.

With specific reference to FIGURE 1, the debarking drum assembly 10 is seen from its front side as it would be rotatably mounted and axially maintained in operative position by three pneumatically tired wheels 12, 14 and 16 in a debarking machine (not shown), as described in the aforesaid co-pending application Serial No. 838,210. It is to be understood that the manner of mounting the peeling members and their counterweights in a rotatable drum is not limited to a drum with a peripheral rim channel as disclosed for cooperation with three tired wheels but is equally applicable to other debarking drums, for example, a drum rotatably mounted in roller bearings and either gear or belt driven.

The basic drum body 20 (FIGURES 1 and 2), is preferably made of heavy steel plate (approximately ¼" in thickness) and is constructed from four components, an outer circular shell 22 with radially outwardly projected side flanges 24 and 26, an inner cylindrical shell 28 and front and rear circular rings 30 and 32. Rings 30 and 32 extend between and are secured by welding to the inner periphery of outer shell 22 and the outer periphery of the inner shell 28, making the drum body 20 a functionally integral and rigid structure. The outer shell 22 with its side flanges 24 and 26 constitutes a channelled rim into which the tires of the three mounting wheels 12, 14 and 16 fit to rotatably mount the drum 10. Cooperation between the sides of the treads of the mounting tires and the inner sides of the rim flanges 24 and 26 maintain axial positioning of the drum 10, with a resilient effect.

The construction of the drum body 20 thus provides a hollow annulus circumscribing the drum center opening through which pass the posts or logs to be debarked. The front and rear circular wall plates 30 and 32 of the drum body provide the rigid support for pivotally mounting a group of bark removing members or peeling blades 40. Although peeling can be accomplished with one blade, it is preferable to have three or more equi-angularly spaced blades to aid in keeping the log centered in the drum and for purposes of balance of the drum. To this end the disclosed debarking drum 10 includes five such blades 40. FIGURES 2 and 3 illustrate the mounting arrangement of the blades and the position of the centrifugally responsive weight assemblies relative to the associated blade 40, FIGURES 1, 4 and 5 showing further blade details.

Five complete pivotally mounted blade and counterweight assemblies are journalled in the basic drum structure 20 (FIGURE 1) at equi-angularly spaced locations. Each blade 40 is nonrotatably mounted at one end to a spindle 42 journalled in the drum annulus as shown in FIGURE 2 and as will be now described. All blade assemblies and their mounting arrangements are similar and hence only one will be described. The front and rear plate rings 30 and 32 are apertured at 44 and 46 in fore and aft coaxial alignment and a metal sleeve 48 fitted into and welded to the edges of the apertures, the sleeve extending through the hollow drum annulus parallel to the drum axis. A pressure type lubrication fitting 50 threaded into the inner drum shell and intersecting the approximate center of metal sleeve 48 enables introduction of lubricant such as grease to the interior of the metal sleeve 48 as desired.

Press fitted into each end of metal sleeve 48 are sleeve bushings 52 and 54, preferably made of bronze, and the aforementioned spindle 42 projects through and is rotatably carried by the bushings 52 and 54. Note, the lubricant fitting 50 is so placed that lubricant injected into metal sleeve 48 is introduced into a space between the two bushings 52 and 54 and will spread fore and aft providing a film of lubricant between the bushings and the spindle.

The forward end of each spindle 42 projects a short distance beyond the front face of ring plate 30 to a reduced diameter end portion 56 which forms a shoulder 58. A peeling blade 40 is non-rotatably secured on the end portion 56 as will be described. The rear end portion 60 of spindle 42 is tapered and terminates in a threaded post 64, the tapered portion 60 being formed with multiple splines 62.

A short counterweight lever 70 is secured on the end 60 of each spindle 42, one of its ends, 72, being enlarged and provided with a tapered, multi-splined aperture 74, the taper and splines of aperture 74 matching the tapered end 60 and splines 62 of spindle 42, and enabling the lever 70 to be mounted and secured in various angular positions on the spindle 42. The arm 76 of lever 70 is inclined slightly away from the drum body 20 and throughout the major part of its length is reduced in diameter to provide a shoulder 78 which serves as an abutment to position a cylindrical counterweight 80. The terminal portion 82 of lever end 76 is threaded, enabling counterweight 80 to be retained on lever arm 76 and secured by a lock nut 86 against a washer 84 which abuts the shoulder 78. The position of weight 80 relative to the spindle axis can be adjusted by varying the thickness of, or using additional washers 84.

The blades 40 are made from leaf spring material each of which is cut to length, properly curved and its base end formed into an eye 90 (FIGURE 4) by conventional methods, such as forging, after which the blade 40 is tempered. The blade eye 90 is formed to provide a press fit over a sleeve 92 having a radial flange 94 at one end. After the blade eye 90 is placed over sleeve 92 and against the sleeve flange 94, a washer or ring 96 is placed over the end of the sleeve 92, held against the blade eye 90 and welded to the sleeve 92. The blade eye 90 is then welded to the sleeve flange 94 and the end washer 96 for a distance of approximately 90° from the eye end 98 as illustrated by the weld marks in FIGURE 4. This 90° extent of weld is sufficient to rigidly secure the blade eye to the sleeve yet at the same time prevents the extremely high weld heat necessary at the welded portion of the eye from reaching the main portion of the blade and destroying its temper.

Sleeve 92 has a bore 100 with a keyway 102, enabling a sliding fit over the reduced forward end portion 56 of spindle 42, and a key 104 in the sleeve keyway 102 and a matching keyway 106 in the spindle end portion 56 non-rotatably locks the sleeve 92 and its attached blade 40 to the spindle 42.

Clearly illustrated in FIGURE 3, sleeve 92 is counterbored at 110, providing an internal shoulder 112 which serves as an abutment for a washer 114. The counterbore 110 is of sufficient diameter to permit insertion of a socket wrench (not shown) used in assembly and disassembly to thread a nut 116 on a threaded extremity 118 of the spindle. The nut forces the washer against sleeve shoulder 112 and maintains the sleeve 92 on the spindle. The nut 116 is preferably flush within the end of sleeve 92 to minimize the existence of protrusions from the drum assembly 10 upon which strips of bark can be trapped to hang on the drum and possibly jam the proper pivotal operation of the blades.

Referring back to FIGURE 2, after sleeve 92 and blade 40 are non-rotatably secured to the forward end of spindle 42, a spacer sleeve 120 and a bronze thrust washer 122 are placed over the spindle 42 and the spindle inserted through the bushings 52 and 54 so the tapered end 60 of spindle 42 projects from the rear of the drum body 20. A second bronze thrust washer 124 is placed over the projecting end of the spindle and the counterweight lever 70 secured in a desired angular position on the spindle. The thickness of spacer sleeve 120 can be varied and should be dimensioned to enable free pivotal movement of the spindle 42 in bushings 52 and 54 and to prevent axial binding between the lever 70 and sleeve 120 against the thrust washers 122 and 124.

In the non-operating position of the peeling blades 40 their peeling end edges 130 may be disposed approximately on the drum axis (FIGURE 1) which can be determined by suitable stops, not shown. In this non-peeling position of the blades 40, the weight lever 70 on the rear end of spindle 42 is preferably inclined approximately thirty (30) degrees outwardly of tangency to the circle through the spindle centers. With such an arrangement, rotation of the drum 10 causes centrifugal force to act on weights 80, tending to pivot the spindles 42 counterclockwise (FIGURE 1), and biasing the blades 40 inwardly. When a log has been inserted into the drum 10 and the blades 40 pivot outwardly as they ride up to the periphery of the log, the weights 80, depending upon the size of the log, will be swung inwardly to a point where the weight lever 70 is preferably approximately tangent to the circle of spindle centers, at which location the centrifugal force developed by the weights will be applied at right angles through the maximum moment arm provided by the location of the weight on lever 70 to force the blades 40 inwardly. The structural correlation between the installed angular position of lever 70 and the blade 40 should not be such as to permit the weight 80 to swing inward beyond a position where it would be overbalanced by centrifugal forces developed by the mass of the blade 40 during drum rotation and to this end, the variable angularity of lever 70 relative to the spindle 42, enables during installation by its splined connection on spindle 42, permits the angular relationship between lever and blade to be varied for use with batches of different sized logs being debarked.

Peeling blade 40 has its inner end 130 formed with a bevel 132 terminated in edge 134 (see FIGURE 5) which is disposed substantially parallel with the drum axis and is narrower than the width of blade 40 at its eye 90. The blade 40 is curved from its peeling end 130 toward the eye 90 in the direction of drum rotation (see FIGURE 1) and the curvature (as illustrated) is such that the inside portion of each blade 40 immediately adjacent the peeling edge 130 forms an approximately radial plane (90°) to the axis of drum 10 when the blades are in a position to peel a post approximately 3–4 inches in diameter. using such blades, this relationship becomes slightly inclined toward the direction of rotation when larger diameter logs are being peeled. For most satisfactory operation, the referred to angle should not be obtuse and should be as close to 90° as practicable, and this relationship with larger logs can be accomplished by changing the blades 40 for one with more curvature. The front edge 136 of blade 40 is substantially radial, although it could be inclined from near the eye in a direction toward the drum 50, and is beveled as shown in FIGURE 2. Inclination and beveling of the front edges 136 of blades 40 is not necessary but may aid somewhat in a more rapid climbing of the blades 40 to the periphery of a post when the end of a post is first introduced into abutment against the front edges of the blades.

FIGURE 5 illustrates, in enlarged detail, the nature of the actual peeling edge 134 of a blade 40. It is not a knife edge, which would tend to scrape and splinter the wood cells of the post, but rather is deliberately ground to a small curvature permitting the blade to ride smoothly over the wood cells yet, at the same time, peeling and scraping all bark and all portions of the impervious membrane layer away from adjacent the wood cells. As an example, with blades 40 made from automotive leaf springs approximately ¼ inch in thickness, the bevel 132 should be approximately forty-five degrees with a radius of curvature on edge 134 of approximately 1/32 inch, for satisfactory operation.

The equiangular spacing of the blades 40 tends to hold a log or post centered in the drum 10 and the peeling edges 130 of the rotating blades 40 will scrape all of the bark off the log with minimum damage to the wood. The resilient nature of the spring leaf blades 40 prevents splintering and tearing of the wood cells around knots in a log, which destructive splintering does occur in debarker machines using heavy and/or rigid blades. If desired, auxiliary springs can be added between the weights 80 and the drum structure 20 to keep the blades 40 biased inwardly when the drum is not rotating and also to aid the centrifugal forces on the weights during rotation and operation.

It is quite important, to obtain smooth and trouble free operation of the debarking drum, that the masses of the blades, the weights and their structural connections be accurately positioned for proper balance about the axis of the drum 10.

The aforedescribed debarking drum is made with relatively inexpensive construction, the peeling blades are located in front of the drum where chips and bark peelings cannot block or jam their pivotal swinging movements, the pivotal mounting is located interior of the drum periphery away from the dirt, dust and bark, the blades are readily removable for replacement and changing and the counterweights are readily adjustable.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A rotatable debarking drum assembly adapted to be rotatably mounted on and driven by tired wheels in a post debarking machine, comprising: an annular hollow drum body constructed from an outwardly flanged channel shaped outer rim, a front ring with plural apertures, a rear ring with plural apertures, and an inner cylindrical shell, said rim, rings and shell constituting a hollow annulus; a plurality of curved spring steel peeling blades having one end formed with an eye; sleeves including bushing means extending between apertures in said two rings and secured to said two rings; a spindle journalled in each of said bushing means in said sleeves on axes parallel to the axis of said drum; a sleeve device non-rotatably rigidly welded to an eye of each blade and non-rotatably releasably fastened to one end of associated one of said spindles at one side of said annulus, each of said blades curving inwardly opposite to the direction of rotation and terminating in a beveled dull peeling edge essentially parallel to the axis of rotation of said drum body; counterweight means secured on the other end of each of said spindles, on the opposite side of said drum body from said blades, constituting centrifugally responsive means which upon rotation of said drum body tend to force the blades pivotally inwardly toward the drum axis.

2. A rotatable debarking drum assembly as defined in claim 1, wherein the eye of each blade constitutes substantially a complete circle, and the weld of the eye to said sleeve device starts at the extreme end of the blade portion constituting said eye and terminates approximately 90° from the extreme end of said eye.

3. A rotatable debarking drum assembly adapted to be rotatably mounted and driven in a post debarking machine, comprising: a circular rim with inner and outer peripheral, substantially cylindrical surfaces; a plurality of spindles angularly spaced around said rim with the axes of said spindles parallel to the axis of said drum assembly and each spindle projecting through said rim between said peripheral surfaces; a plurality of spindle mounting means secured within said rim and containing bushings rotatably journalling associated ones of said spindles; a plurality of curved leaf spring steel blades having one end curved to provide a mounting eye constituting substantially a complete circle; means rigidly and non-rotatably secured to each blade eye and releasably non-rotatably mounted on one projected end of an associated said spindle so that each of said blades is disposed in offset relationship from one side of said rim, curving inwardly opposite to the intended direction of rotation of said drum assembly; the inner end of each blade terminating in a beveled dull edge essentially parallel to the axis of rotation of said assembly; a plurality of levers each one being non-rotatably secured to the other projected end of an associated said spindle on the opposite side of said rim from said blades; a weight rigidly secured on each lever; and means at one end of each lever and at one end of each spindle enabling an angularly adjustable rigid connection between each lever and said spindle; said weights and levers comprising centrifugally responsive means disposed so that upon rotation of said rim the blades are biased inwardly toward the center of said rim.

4. A rotatable debarking drum assembly adapted to be rotatably mounted and driven in a post debarking machine as defined in claim 3, wherein axially spaced rim positioning flanges are provided on the outer periphery of said rim adjacent the ends of said outer peripheral surface; and said outer peripheral surface and said flanges constitute an annular channel means enabling rotatable mounting, axial positioning and transfer of rotational drive forces to said drum assembly.

5. A rotatable debarking drum assembly adapted to be rotatably mounted and driven in a post debarking machine, comprising: a circular rim with inner and outer peripheral, substantially cylindrical surfaces; a plurality of spindles angularly spaced around said rim with the axes of said spindles parallel to the axis of said drum assembly and each spindle projecting through said rim between said peripheral surfaces; a plurality of spindle mounting means secured within said rim and containing bushings rotatably journalling associated ones of said spindles; a plurality of curved leaf spring steel blades having one end curved to provide a mounting eye constituting substantially a complete circle; means rigidly and non-rotatably secured to each blade eye and releasably non-rotatably mounted on one projected end of an associated said spindle so that each of said blades is disposed in offset relationship from one side of said rim, curving inwardly opposite to the intended direction of rotation of said drum assembly; the inner end of each blade terminating in a beveled dull edge essentially parallel to the axis of rotation of said assembly; a plurality of levers each one being non-rotatably secured to the other projected end of an associated said spindle on the opposite side of said rim from said blades; a weight rigidly secured on each lever; said weights and levers comprising centrifugally responsive means disposed so that upon rotation of said rim the blades are biased inwardly toward the center of said rim; and means included in each of said blade, spindle, lever and weight subassemblies enabling relative angular adjustment between said blade and associated lever about their associated spindle to vary the centrifugal effect of said lever and associated weight on their said associated blade.

References Cited in the file of this patent
UNITED STATES PATENTS 2,787,304    Brundell et al.             Apr. 2, 1957

(Other references on following page)

UNITED STATES PATENTS

| | | | |
|---|---|---|---|
| 2,803,142 | Kauffman | Aug. 20, | 1957 |
| 2,843,168 | Lunn | July 15, | 1958 |
| 2,853,327 | Traugott | Sept. 23, | 1958 |
| 2,857,945 | Brundell et al. | Oct. 28, | 1958 |
| 2,911,020 | Wennberg | Nov. 3, | 1959 |
| 2,983,291 | Dick | May 9, | 1961 |

FOREIGN PATENTS

| | | | |
|---|---|---|---|
| 537,677 | Canada | Mar. 5, | 1957 |
| 215,700 | Australia | June 11, | 1958 |